US010291968B2

(12) United States Patent
Gaste et al.

(10) Patent No.: US 10,291,968 B2
(45) Date of Patent: May 14, 2019

(54) SYNCHRONIZATION BETWEEN MULTIMEDIA FLOWS AND SOCIAL NETWORK THREADS (71) Applicant: Alcatel Lucent, Boulogne Billancourt (FR)

(72) Inventors: Yann Gaste, Nozay (FR); Jerome Picault, Massy (FR); Myriam Ribiere, Belmont, MA (US); Abdelkrim Hebbar, Nozay (FR)

(73) Assignee: ALCATEL LUCENT, Nozay (FR)

( * ) Notice: Subject to any disclaimer, the term of this patent is extended or adjusted under 35 U.S.C. 154(b) by 155 days.

(21) Appl. No.: 14/895,515

(22) PCT Filed: Jun. 2, 2014

(86) PCT No.: PCT/EP2014/061362
§ 371 (c)(1),
(2) Date: Dec. 3, 2015

(87) PCT Pub. No.: WO2014/195261
PCT Pub. Date: Dec. 11, 2014

(65) Prior Publication Data
US 2016/0112772 A1 Apr. 21, 2016

(30) Foreign Application Priority Data
Jun. 3, 2013 (EP) .................................... 13305733

(51) Int. Cl.
*H04N 21/8405* (2011.01)
*H04N 21/845* (2011.01)
(Continued)

(52) U.S. Cl.
CPC ......... *H04N 21/8405* (2013.01); *G06Q 10/10* (2013.01); *G06Q 50/01* (2013.01);
(Continued)

(58) Field of Classification Search
CPC ........... G06F 17/30817; G06F 17/3082; G06F 3/048; G06F 17/30525; G06F 17/3053;
(Continued)

(56) References Cited

U.S. PATENT DOCUMENTS

2009/0164904 A1* 6/2009 Horowitz .......... G06F 17/30817
715/723

FOREIGN PATENT DOCUMENTS

CN 102164355 A 8/2011
WO WO 2011/009101 A1 1/2011
(Continued)

OTHER PUBLICATIONS

Masami Nakazawa et al., "Social Indexing of TV Programs: Detection and Labeling of Significant TV Scenes by Twitter Analysis," 2012 26th International Conference on Advanced Information Networking and Applications Workshops (WAINA), IEEE, pp. 141-146, XP032169774, 2012.*
(Continued)

*Primary Examiner* — Hai V Tran
(74) *Attorney, Agent, or Firm* — Fay Sharpe LLP (57) ABSTRACT For controlling synchronization between a multimedia flow and a related social network thread, a device able to capture the multimedia flow and the social network thread selects (S1) a time interval, determines (S2) a list of multimedia keywords associated with the multimedia flow and determines (S3) a list of social keywords associated with the social network thread, each multimedia keyword and each social keyword being associated with a timestamp. The device produces (S4) a filtered list of filtered multimedia keywords by selecting distinctive multimedia keywords, each filtered multimedia keyword being associated with a set of similar social keywords, computes (S5) a set of delays for at least one filtered multimedia keyword, each delay corre-
(Continued)

sponding to the time difference between the timestamp of the filtered multimedia keyword and the timestamp of a similar social keyword associated with the filtered multimedia keyword, and determines (S6) a drift for the time interval by means of at least one set of delays.

13 Claims, 3 Drawing Sheets

(51) Int. Cl.
    *H04N 21/4788* (2011.01)
    *H04N 21/242* (2011.01)
    *H04N 21/2665* (2011.01)
    *H04N 21/8547* (2011.01)
    *G06Q 10/10* (2012.01)
    *G06Q 50/00* (2012.01)
    *H04N 21/234* (2011.01)

(52) U.S. Cl.
CPC ..... *H04N 21/23424* (2013.01); *H04N 21/242* (2013.01); *H04N 21/2665* (2013.01); *H04N 21/4788* (2013.01); *H04N 21/8456* (2013.01); *H04N 21/8547* (2013.01)

(58) Field of Classification Search
CPC . G06F 3/0484; G06F 17/30843; H04L 51/32; H04N 21/4788; H04N 21/4826; H04N 21/8456
See application file for complete search history.

(56) References Cited

FOREIGN PATENT DOCUMENTS

WO    WO 2011009101 A1 * 1/2011 ......... H04N 21/4788
WO    WO 2013/045123 A1    4/2013

OTHER PUBLICATIONS

Adam Marcus et al., "Twitinfo: Aggregating and Visualizing Microblogs for Event Exploration," CHI 2011, Session: Twitter Systems, 227-236, XP055044158, Vancouver, BC, Canada, May 7-12, 2011.
Shawndra Hill et al., "Social TV: Real-Time Social Media Response to TV Advertising" Data Mining for Online Advertising and Internet Economy, ACM, pp. 1-9, XP058009583, 2012.
International Search Report for PCT/EP2014/061362 dated Aug. 5, 2014.

* cited by examiner

SYNCHRONIZATION BETWEEN MULTIMEDIA FLOWS AND SOCIAL NETWORK THREADS

FIELD OF THE INVENTION

The present invention pertains to a mechanism for synchronization between multimedia flows and social network threads.

BACKGROUND

Social media services and micro blogging applications are changing the way in which many people consume traditional broadcast media. Real-time backchannel conversations are now common-place as people simultaneously watch TV whilst using social media to broadcast their own thoughts, sentiments, opinions and emotions related to what they are watching.

Yet, content analysis of social interactions such as social network threads may be a good approach for enriching knowledge about multimedia contents. The study of the content of social interactions associated to a multimedia flow can contribute to:

Increase knowledge about the multimedia content: people often speak about what is happening in the multimedia content (events, people, places, etc.). This can be used to enrich the multimedia description, but also express various viewpoints, helpful to categorize the acquired knowledge with different levels of expressiveness.

Extend the content by creating semantic links to other pieces of content (on the basis of similarities of interactions). This will let people discover alternative multimedia resources through other people's conversations.

Whatever the relevance of social media comments provided in relationship with a multimedia flow such a TV show, there is a natural delay between the time at which the user decides to react to what he is watching and the time at which he posts his reaction (delay due to cognition, analysis, reaction and also due to the system: entry mode, device, network).

This delay is somehow considered as not significant and almost ignored by existing algorithms, which is probably relevant to index a whole two hours video sequence for example. But taking into account the delay is particular mandatory:

to provide efficiently a new format of socialized multimedia stream, containing both social and multimedia data, to enable in-media indexation and navigation in order to offer dynamic navigation within the content segments based on the metadata structure.

Moreover, anchoring methods based only on time are not fully satisfactory, due to uncertainties related to the moment social media is produced, the type of platform used, or because social media is produced by bursts which depends on the very content of the media.

Therefore, there is a need to provide a new, more flexible mechanism for synchronization of a broadcast multimedia content with the related social information.

SUMMARY

This summary is provided to introduce concepts related to the present inventive subject matter. This summary is not intended to identify essential features of the claimed subject matter nor is it intended for use in determining or limiting the scope of the claimed subject matter.

In accordance with one embodiment, a method is provided for controlling synchronization between a multimedia flow and a related social network thread, the method comprising the following steps in a device able to capture the multimedia flow and the social network thread:

selecting a time interval, determining a list of multimedia keywords associated with a part of the multimedia flow corresponding to the time interval, each multimedia keyword being associated with a timestamp, determining a list of social keywords associated with a part of the social network thread corresponding to the time interval, each social keyword being associated with a timestamp, producing a filtered list of filtered multimedia keywords by selecting distinctive multimedia keywords, each filtered multimedia keyword being associated with a set of similar social keywords, computing a set of delays for at least one filtered multimedia keyword, each delay corresponding to the time difference between the timestamp of the filtered multimedia keyword and the timestamp of a similar social keyword associated with the filtered multimedia keyword, determining a drift for the time interval by means of at least one set of delays.

Advantageously, the invention offers a system allowing to deeply synchronize social network threads such as social data streams with multimedia flows, where the mechanism is based on the combination of a timestamp and the semantic similarity between the social network thread and the multimedia flow.

Additionally, beyond simple viewing or sharing facilities, an effective synchronization process between streams will improve the accuracy of the in-media indexation process, enabling more complex usages, consisting in organizing, transforming, decomposing and recomposing multimedia contents.

The benefit of this invention is to enable the synchronization of the broadcast multimedia content with the related social information regardless of the style (live or not live) of media consumption. It provides an innovative solution to anchor social data streams with multimedia content by completing and enhancing a pure timestamp synchronization process.

The system can use temporal information and semantics analysis to assemble different multimedia sources, leveraging and easing the production and the consumption of both social media services and micro blogging applications.

In an embodiment, the time interval is selected after having identified a peak in a related social network thread, the time interval end corresponding to the top of the peak.

In an embodiment, a peak is identified by a high variation of messages volume in the social network thread.

In an embodiment, a distinctive multimedia keyword has a low number of occurrences among the multimedia keywords in the corresponding time interval.

In an embodiment, a similar social keyword associated with a filtered multimedia keyword is a keyword that has similar meaning or that is semantically close with respect to the filtered multimedia keyword.

In an embodiment, a delay is computed for each similar social keyword in the list of social keywords.

In an embodiment, the drift for the time interval is determined if the number of filtered multimedia keywords is greater than a predefined threshold.

In an embodiment, the drift for the time interval is determined if the number of delays associated with the filtered multimedia keyword is greater than a given threshold and if the entropy of the delays distribution is low.

In an embodiment, the drift for the time interval is determined by means of global delays related to filtered multimedia keywords, a global delay related to a filtered multimedia keyword being an average of a given number of delays associated with the filtered multimedia keyword.

In an embodiment, the drift corresponds to an average of all global delays related to the filtered multimedia keywords.

In an embodiment, the list of multimedia keywords associated with the multimedia flow is determined after having extracted a multimedia fragment of the multimedia flow corresponding to the time interval, and after having analyzed content of the multimedia fragment to generate a multimedia fragment descriptor containing multimedia descriptive elements.

In an embodiment, the list of social keywords associated with the multimedia flow is determined after having analyzed a set of data in the social network thread corresponding to the time interval to generate a thread descriptor containing thread descriptive elements.

The invention also pertains to a device for controlling synchronization between a multimedia flow and a related social network thread, the device being able to capture the multimedia flow and the social network thread and comprising:

means for selecting a time interval, means for determining a list of multimedia keywords associated with a part of the multimedia flow corresponding to the time interval, each multimedia keyword being associated with a timestamp, means for determining a list of social keywords associated with a part of the social network thread corresponding to the time interval, each social keyword being associated with a timestamp, means for producing a filtered list of filtered multimedia keywords by selecting distinctive multimedia keywords, each filtered multimedia keyword being associated with a set of similar social keywords, means for computing a set of delays for at least one filtered multimedia keyword, each delay corresponding to the time difference between the timestamp of the filtered multimedia keyword and the timestamp of a similar social keyword associated with the filtered multimedia keyword, means for determining a drift for the time interval by means of at least one set of delays.

The invention also pertains to a computer program capable of being implemented within a device, said program comprising instructions which, when the program is executed within said device, carry out steps of the method according to the invention.

BRIEF DESCRIPTION OF THE FIGURES

The present invention and the benefits thereof shall be better understood upon examining the description below, which makes reference to the attached figures, in which.

The same reference number represents the same element or the same type of element on all drawings.

DESCRIPTION OF EMBODIMENTS

Figure 1:
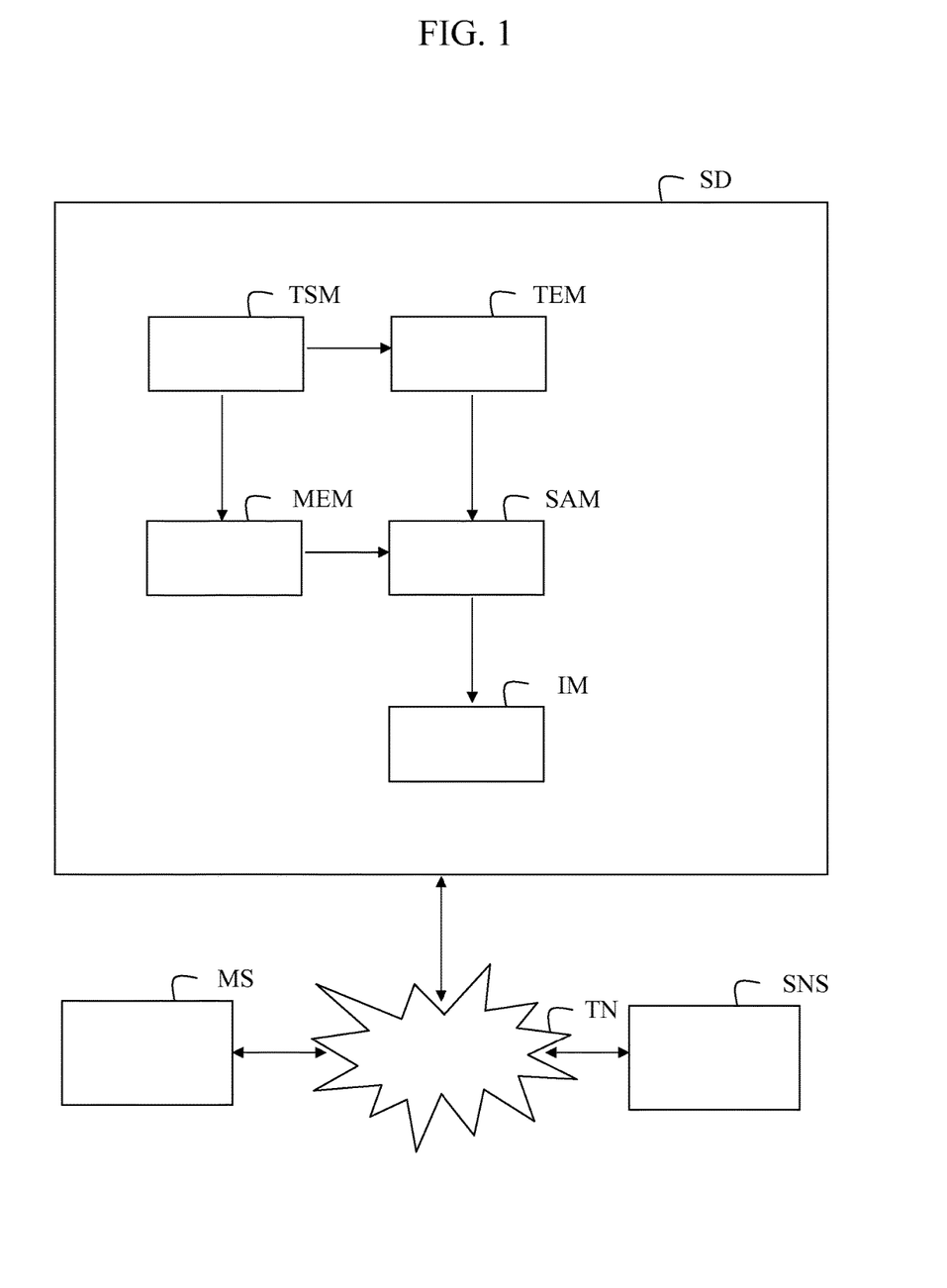
FIG. 1 is a schematic block diagram of a communication system according to one embodiment of the invention for controlling a synchronization between a multimedia flow and a related social network thread.

With reference to FIG. 1, a communication system according to the invention comprises a telecommunication network TN, a synchronization device SD, at least one multimedia server MS and at least one social network server SNS.

The telecommunication network TN may be a wired or wireless network, or a combination of wired and wireless networks.

The telecommunication network TN can be a packet network, for example, an IP ("Internet Protocol") high-speed network such as the Internet or an intranet, or even a company-specific private network.

As an introduction, a few terms and concepts that are helpful for understanding the invention are defined below.

The invention aims at offering a synchronization device SD intended for computing a set of delays over the time based on a semantic analysis of a multimedia flow and social network thread related to a same multimedia content.

A multimedia flow is provided by a multimedia server MS toward a requesting communication device through the telecommunication network TN.

A multimedia flow can be an IPTV (Internet Protocol TeleVision) stream, or may be any other kind of video stream, an audio stream, a slideshow, a text stream such as a news title stream, and the like.

The multimedia flow can be a live stream that is broadcasted by the multimedia server MS and that is associated with an online or a real-time multimedia content. Alternatively, the multimedia flow can be associated with offline content like an uploaded content used by a dedicated service of the multimedia server.

A social network thread is an aggregation of essentially user posted messages, possibly in reply to each other, and possibly with enclosed or embedded contents such as pictures, short videos, links, etc. The social network threads are stored in social network databases that are located on remote at least one social network server SNS forming a social network platform and are accessed via the internet.

For instance, social network threads may be annotations, like comments from a person about one element of a multimedia content, or conversations between people about a multimedia content.

In a social network thread, each message is associated with a time stamp.

The timestamp associated to a message in a social network thread corresponds to the absolute time that has been registered by the social network platform when receiving the message, which is different from the reference time that is the moment of time in the multimedia flow the message is referring. Therefore, a strategy has to be put in place to perform a "drift correction" corresponding to the delay between the two different times.

The synchronization device SD comprises a time selection module TSM, a thread extraction module TEM, a multimedia extraction module MEM, a semantic analysis module SAM, an inspection module IM.

The time selection module TSM identifies peaks in social network threads.

To that end, the time selection module TSM selects a time window to build a map threads distribution over time.

As the amount and the distribution of data in threads can significantly vary over time, the time selection module TSM can use filtering algorithms like moving average or Gaussian filters in order to smooth out short-term fluctuations and to highlight longer-term trends or cycles. The threshold between short-term and long-term depends on the application, and the parameters of the moving average can be set accordingly.

The time selection module TSM can use peak detection algorithms, for example as described in reference "Simple Algorithms for Peak Detection in Time-Series", [in Proc. 1st Int. Conf. Advanced Data Analysis, Business Analytics and Intelligence, 2009] in order to identify peaks or spikes in a given time-series of social network threads.

The smoothing out of short-term fluctuations allows to delete small variations that can correspond to some kind of noise or anomalies without relation with the topic of the social network thread.

The time selection module TSM selects a small length multimedia flow segment (e.g. 5 min, the value can be determined empirically) before an "event" or a peak identified by a consequent variation of messages volume, i.e. numbers of messages in a social network thread during the length of the multimedia flow segment. In this way, each relevant peak identifies a time interval or a multimedia flow segment to target.

Figure 2:
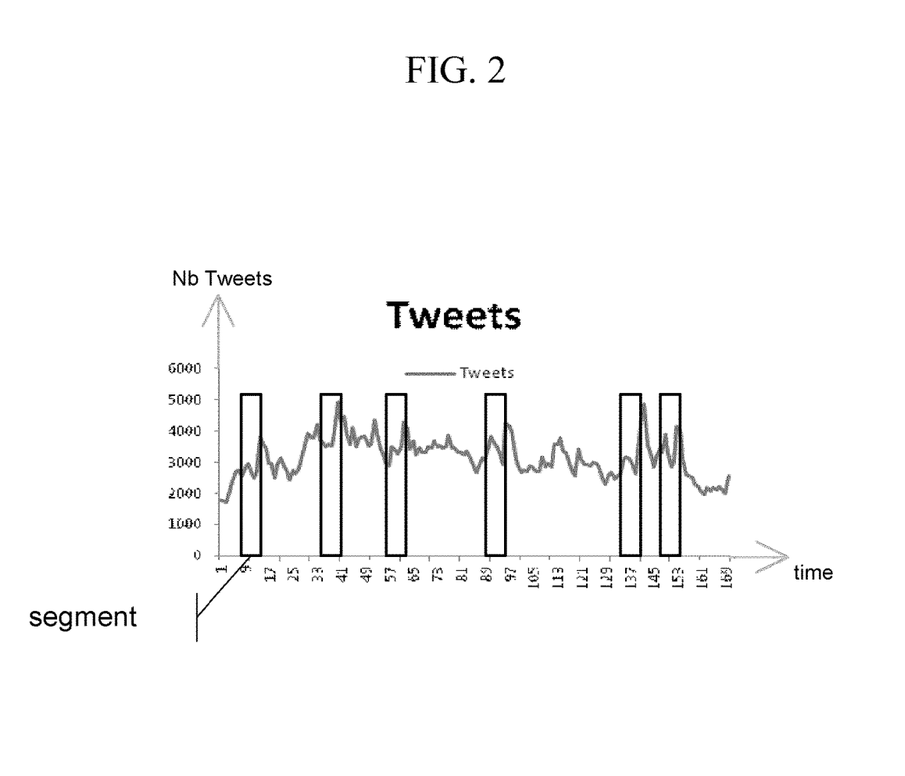
FIG. 2 illustrates an example of distribution of messages of a network social thread over time.

In reference with FIG. 2, the messages of a network social thread are for example "tweets" from Twitter™. The distribution of the number of tweets over time is shown. Each selected multimedia flow segment to target is represented by a rectangle that coincides with a peak in the number of tweets. More precisely, the time of end of a segment coincides with a peak. The peak means that an event has occurred, in other terms that users have reacted to the previous multimedia flow segment by posting many messages.

Referring back to FIG. 1, the thread extraction module TEM and the multimedia extraction module MEM are responsible for gathering knowledge information from raw data streams related to social network threads and multimedia flows for targeted time intervals.

The thread extraction module TEM uses predictive methods for analyzing social network threads that are unstructured information and for generating descriptors for social network threads, potentially enriched with context information and extended with general-purpose thesauri or dictionaries. The thread extraction module TEM captures vectors of keywords from social network threads associated to a time interval.

The multimedia extraction module MEM uses feature descriptors in image and video processing (or audio transcripts if available) to extract knowledge information for the multimedia flows. The multimedia extraction module MEM applies analysis techniques to extract a vector of keywords. In a possible embodiment for audio streams, the multimedia extraction module MEM can use technologies such as speech to text plus keyword extraction for each sentence from a multimedia segment; for video streams, object recognition, person recognition techniques can be used.

More especially, the multimedia extraction module MEM is configured to extract parts of a multimedia content as fragments, and to isolate multimedia fragments, containing frames or pictures, scenes or sound extracts.

The multimedia extraction module MEM can convert the multimedia fragments in data usable for search queries or analysis, by extracting descriptive elements and properties from the fragments. For example, if the fragments comprise a picture of an actor, the multimedia extraction module MEM may use a face recognition subunit to identify said actor, and isolate his name as a relevant descriptive element to use in search queries. Other possible data sources include object recognition on the pictures, music and sound recognition on the audio track, optical character recognition (OCR), speech-to-text conversion, chromatic analysis and the like. The processes and techniques used to analyse the multimedia flow may be varying according to the nature of said multimedia flow.

For example, if the multimedia flow is a radio or more generally a sound stream, the multimedia extraction module MEM can run voice detection methods to identify the presence of a speech. In case a speech is detected, the multimedia extraction module MEM uses a speech-to-text conversion subunit to transcript the sound in searchable words. If no speech is detected, or in addition or in parallel to the speech-to-text transcription, the multimedia extraction module MEM may use sound or music recognition subunits, for example to identify the title and artist of a played music track, or the name of a sound source (instrument, animal, etc.) and use them as keywords.

If the multimedia stream is a video stream or slide show, the multimedia extraction module MEM can use for example face or object recognition subunits, to identify people or objects on the multimedia fragment. The names obtained are then used as keywords.

The multimedia extraction module MEM may also use structural or descriptive metadata. For example, on an IPTV program, the title, a short synopsis and/or the cast and authors and producers may be broadcasted by multiplexing the data with the multimedia content.

The thread extraction module TEM produces a list of social keywords from the analysis of descriptors for social network threads in the time interval. Each social keyword is associated with a timestamp.

The multimedia extraction module MEM produces a list of multimedia keywords from the analysis of descriptors for the fragment of multimedia flow corresponding to the time interval. Each multimedia keyword is associated with a timestamp.

The semantic analysis module SAM is in charge of performing a semantic analysis in the list of social keywords and the list of multimedia keywords.

For each time interval, a strict similarity measure is computed and used for the multimedia keywords. Any similarity metric of the literature can be used as far as it satisfies the following constraints:

1) a very high similarity ratio for comparing the diversity of sets a multimedia keywords, using for example semantic analysis with respect to social keywords, and 2) multimedia keywords are previously filtered to only select distinctive words in the list of multimedia keywords.

As an example, a term frequency-inverse document frequency (TF-IDF) or dictionaries could be used to emphasize with a meaningful keywords which happen the less frequently. A strict similarity measure process therefore provides possible co-occurrences with a high probability of pertinence. Examples of similarities include e.g. the cosine similarity or a similarity such as the Sorensen-Dice coefficient.

The semantic analysis module SAM produces a filtered list of filtered multimedia keywords after the strict similarity measure on the initial list of multimedia keywords. For that, the semantic analysis module SAM selects distinctive multimedia keywords that have a high similarity ratio with social keywords. For each distinctive multimedia keyword, "similar" keywords can appear several times in the social thread, and each similar social keyword can have several occurrences.

The semantic analysis module SAM selects similar social keywords that are present in the list of social keywords, and that are similar to filtered multimedia keyword. For each filtered keyword in the filtered list of filtered multimedia keywords, at least one similar social keyword in the list of social keywords is selected. Other occurrences of a similar social keyword can appear in the list of social keywords; in this case, these occurrences are also selected. It is assumed that similar social keywords are keywords that have similar meaning or that are semantically close. At the end, each filtered multimedia keyword is associated with a set of similar social keywords.

The inspection module IM computes a delay value for a filtered multimedia keyword by taking the time difference between the timestamp of a similar social keyword in the list of social keywords and the timestamp of the filtered multimedia keyword in the filtered list of filtered multimedia keywords. A delay value is computed for each similar social keyword in the list of social keyword.

Finally, the inspection module IM provides a final list of keyword, each keyword being associated with a list of delays, the number of delays per keyword corresponding to the number of similar social keywords in the list of social keywords.

The inspection module IM identifies if the time interval is qualified or not. A time interval is qualified if a significant number (defined empirically) of relevant keywords is found.

To identify if a keyword is considered as relevant, the inspection module IM checks two criteria:

1/ the numbers of delays associated with the keyword is greater than a threshold that is defined empirically; and 2/ the entropy (the variance for example) of the delays distribution is low. It means that delays calculated are more or less of the same order of magnitude.

The inspection module IM can then calculate a global delay for the keyword, for example as an average of all delays associated with the keyword or as an average of a given number of delays associated with the keyword.

If a time interval is considered as not relevant (i.e. there is no significant number of relevant keywords), the related results and the time interval are ignored for future synchronization process.

The inspection module IM determines a final drift for this qualified time interval by means of different global delays related to the relevant keywords. For example, the final drift corresponds to an average of all global delays related to the relevant keywords.

Figure 3:
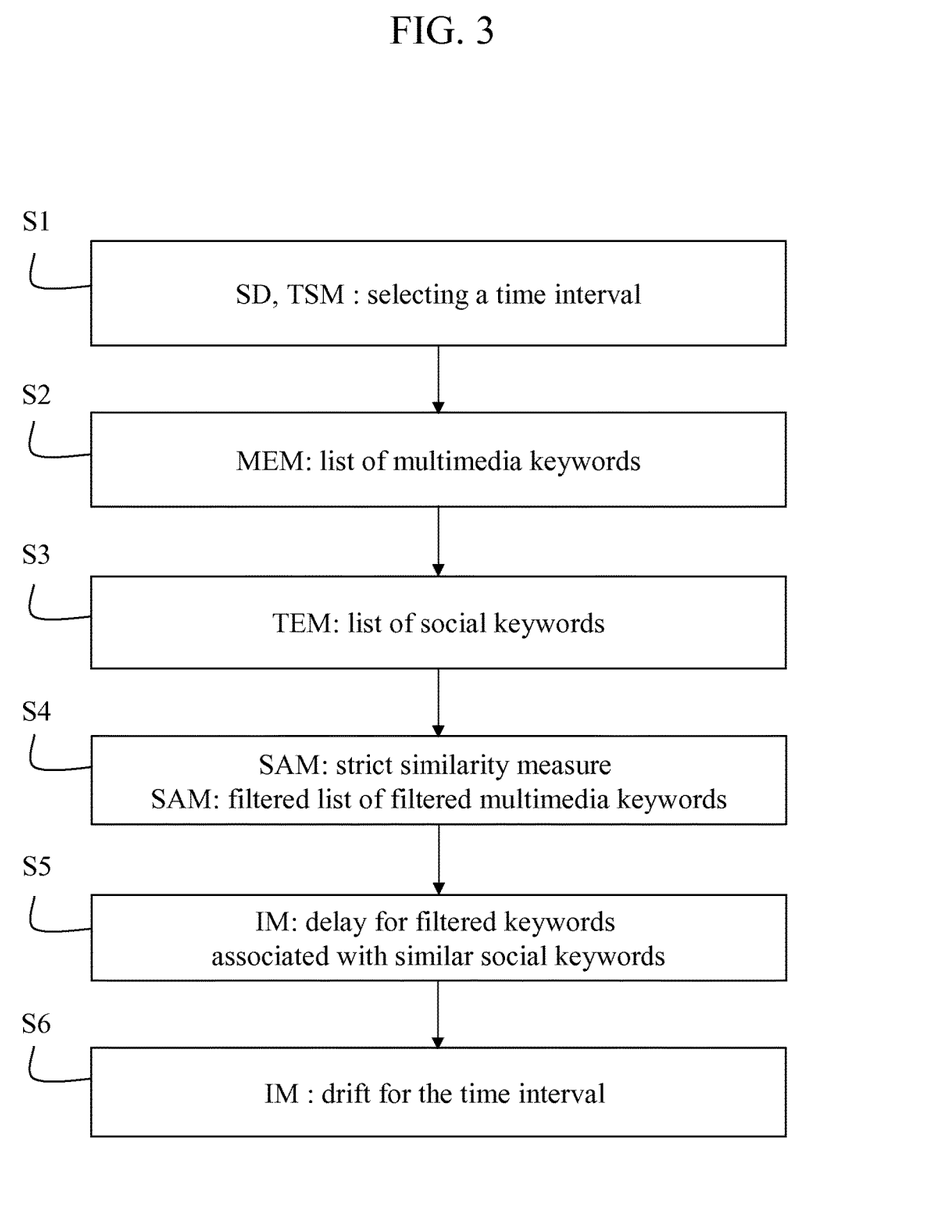
FIG. 3 is an algorithm of a method for controlling a synchronization between a multimedia flow and a related social network thread according to one embodiment of the invention.

With reference to FIG. 3, a method for controlling a synchronization between a multimedia flow and a related social network thread according to one embodiment of the invention comprises steps S1 to S6 executed within the communication system.

In step S1, the time selection module TSM of the synchronization device SD selects a time interval, corresponding to a multimedia flow segment. The time interval is identified after having identified at least one peak in a related social network thread, the time interval end corresponding to the top of a peak.

In step S2, the multimedia extraction module MEM determines a list of multimedia keywords associated with the part of the multimedia flow corresponding to the time interval, each multimedia keyword being associated with a timestamp.

For example, a fragment of the multimedia flow corresponding to the time interval is analysed for extracting significant elements such as: face, object and character recognition for embedded images and videos, music and sound recognition for audio tracks.

In step S3, the thread extraction module TEM determines a list of social keywords associated with the part of the social network thread corresponding to the time interval, each social keyword being associated with a timestamp.

Recurrent keywords are listed with the number of times they occur in the considered social network thread.

In step S4, the semantic analysis module SAM filters the list of multimedia keywords by using a strict similarity measure on the keywords in the list. The semantic analysis module SAM produces a filtered list of filtered multimedia keywords after the strict similarity measure on the initial list of multimedia keywords.

To that end, the semantic analysis module SAM selects distinctive multimedia keywords that have a high similarity ratio with social keywords. It is assumed that a distinctive multimedia keyword has a relative low number of occurrences among the set of multimedia keywords with respect to other multimedia keywords.

The similarity ratio can be based on a semantic analysis.

For each filtered multimedia keyword in the filtered list, the semantic analysis module SAM selects a set of social keywords in the list of social keywords that are similar to the filtered multimedia keyword. Each filtered multimedia keyword is then associated with a set of similar social keywords.

In step S5, the inspection module IM computes a delay value for a filtered multimedia keyword by taking the time difference between the timestamp of the filtered multimedia keyword and the timestamp of a similar social keyword associated with the filtered multimedia keyword. A delay value can be computed for each similar social keyword in the list of social keywords. The inspection module IM computes a delay value for each filtered multimedia keyword.

The inspection module IM provides a final list of filtered multimedia keywords, each filtered multimedia keyword being associated with a list of delays, the number of delays per filtered multimedia keyword corresponding to the number of similar social keywords in the list of social keywords. Each filtered multimedia keyword in the final list can be a multimedia keyword as each multimedia keyword has only one occurrence in the filtered list of multimedia keywords.

In step S6, the inspection module IM identifies if the time interval is qualified or not. A time interval is qualified if a significant number of different relevant filtered multimedia keywords is found, i.e. if the number of different relevant filtered multimedia keywords is greater than a predefined threshold.

A filtered multimedia keyword is considered as relevant if the numbers of delays associated with the filtered multimedia keyword is greater than a given threshold and if the entropy of the delays distribution is low.

The inspection module IM calculates a global delay for the filtered multimedia keyword, by means of the delays related to the filtered multimedia keyword.

The inspection module IM determines a final drift for the qualified time interval by means of different delays related to the relevant filtered multimedia keywords, more especially by means of different global delays related to the relevant filtered multimedia keywords. The final drift is representative of the average time difference between the multimedia flow and the related social network thread.

For example, the final drift value can be used to adjust the real timestamp of tweets to be displayed together with a "replay-able" socialized multimedia content, i.e. a multimedia content that can be downloaded and that is associated with a social network thread. Thus, the final drift value is used to synchronize the multimedia flow with the social network thread.

The invention described here relates to a method and a device for controlling a synchronization between a multimedia flow and a related social network thread. According to one implementation of the invention, the steps of the invention are determined by the instructions of a computer program incorporated into a device, such as the synchronization device SD. The program comprises program instructions which, when said program is loaded and executed within the device, carry out the steps of the method.

Consequently, the invention also applies to a computer program, particularly a computer program on or within an information medium, suitable to implement the invention. This program may use any programming language, and be in the form of source code, object code, or intermediate code between source code and object code, such as in a partially compiled form, or in any other form desirable for implementing the method according to the invention.

The invention claimed is:

1. A method for controlling synchronization between a multimedia flow and a related social network thread, comprising the following in a device able to capture the multimedia flow and the social network thread:
   selecting a time interval as a function of a peak identified in a social network thread,
   producing a list of multimedia keywords associated with a part of the multimedia flow corresponding to the time interval, each multimedia keyword being associated with a timestamp,
   determining a list of social keywords associated with a part of the social network thread corresponding to the time interval, each social keyword being associated with a timestamp and via analysis of descriptors for social network threads in the time interval,
   producing a filtered list of filtered multimedia keywords by selecting distinctive multimedia keywords, each filtered multimedia keyword being associated with a set of similar social keywords identified as having a similarity ratio above a predetermined threshold,
   computing a set of delays for at least one filtered multimedia keyword, each delay corresponding to the time difference between the timestamp of the filtered multimedia keyword and the timestamp of a similar social keyword associated with the filtered multimedia keyword,
   determining a drift for the time interval by means of at least one set of delays, wherein the drift for the time interval is determined as a function of global delays related to filtered multimedia keywords, a global delay related to a filtered multimedia keyword being an average of a given number of delays associated with the filtered multimedia keyword.

2. The method according to claim 1, wherein the time interval is selected after having identified the peak in the social network thread, the time interval end corresponding to the top of the peak.

3. The method according to claim 2, wherein the peak is identified by a high variation of messages volume in the social network thread.

4. The method according to claim 1, wherein a distinctive multimedia keyword has a low number of occurrences among the multimedia keywords in the corresponding time interval.

5. The method according to claim 1, wherein a similar social keyword associated with a filtered multimedia keyword is a keyword that has similar meaning or that is semantically close with respect to the filtered multimedia keyword.

6. The method according to claim 1, further comprising computing the delay for each similar social keyword in the list of social keywords.

7. The method according to claim 1, further comprising determining the drift for the time interval upon a determination that the number of filtered multimedia keywords is greater than a predefined threshold.

8. The method according to claim 1, further comprising determining the drift for the time interval upon a determination that the number of delays associated with the filtered multimedia keyword is greater than a given threshold and upon a determination that the entropy of the delays distribution is low.

9. The method according to claim 1, wherein the drift corresponds to an average of all global delays related to the filtered multimedia keywords.

10. The method according to claim 1, wherein the list of multimedia keywords associated with the multimedia flow is determined after having extracted a multimedia fragment of the multimedia flow corresponding to the time interval, and after having analyzed content of the multimedia fragment to generate a multimedia fragment descriptor containing multimedia descriptive elements.

11. The method according to claim 1, wherein the list of social keywords associated with the multimedia flow is determined after having analyzed a set of data in the social network thread corresponding to the time interval to generate a thread descriptor containing thread descriptive elements.

12. The device for controlling synchronization between a multimedia flow and a related social network thread, the device being able to capture the multimedia flow and the social network thread and comprising:
    means for selecting a time interval,
    means for determining a list of multimedia keywords associated with a part of the multimedia flow corresponding to the time interval, each multimedia keyword being associated with a timestamp,
    means for determining a list of social keywords associated with a part of the social network thread corresponding to the time interval, each social keyword being associated with a timestamp,
    means for producing a filtered list of filtered multimedia keywords by selecting distinctive multimedia keywords, each filtered multimedia keyword being associated with a set of similar social keywords,
    means for computing a set of delays for at least one filtered multimedia keyword, each delay corresponding to the time difference between the timestamp of the filtered multimedia keyword and the timestamp of a similar social keyword associated with the filtered multimedia keyword,
    means for determining a drift for the time interval by means of at least one set of delays.

13. A computer program stored on a non-transitory computer-readable medium in a device and configured to control synchronization between a multimedia flow and a related social network thread, the device being configured to capture the multimedia flow and the social network thread, the program comprising instructions which, once the program is loaded and executed within said device, carry out the following:

selecting a time interval as a function of a peak identified in a social network thread,     producing a list of multimedia keywords associated with a part of the multimedia flow corresponding to the time interval, each multimedia keyword being associated with a timestamp,     determining a list of social keywords associated with a part of the social network thread corresponding to the time interval, each social keyword being associated with a timestamp and via analysis of descriptors for social network threads in the time interval,     producing a filtered list of filtered multimedia keywords by selecting distinctive multimedia keywords, each filtered multimedia keyword being associated with a set of similar social keywords identified as having a similarity ratio above a predetermined threshold,     computing a set of delays for at least one filtered multimedia keyword, each delay corresponding to the time difference between the timestamp of the filtered multimedia keyword and the timestamp of a similar social keyword associated with the filtered multimedia keyword,     determining a drift for the time interval by means of at least one set of delays, wherein the drift for the time interval is determined as a function of global delays related to filtered multimedia keywords, a global delay related to a filtered multimedia keyword being an average of a given number of delays associated with the filtered multimedia keyword.

\* \* \* \* \*